Figure 1:
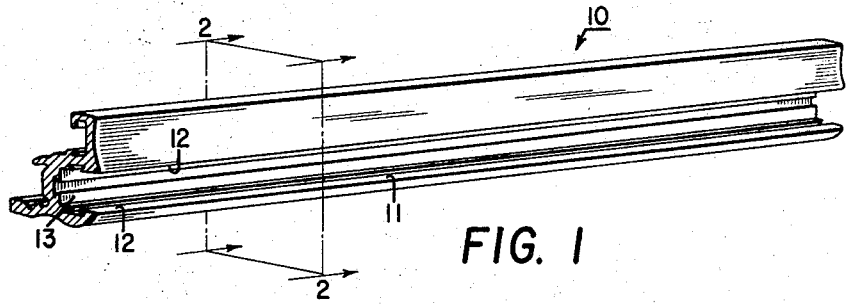

Jan. 7, 1969  K. Q. KONDOLF  3,420,002

WINDOW GLASS FRAME AND GUIDE

Filed May 4, 1965

INVENTOR.
KARL Q. KONDOLF
BY
HIS ATTORNEYS.

United States Patent Office 3,420,002
Patented Jan. 7, 1969

3,420,002
WINDOW GLASS FRAME AND GUIDE
Karl Q. Kondolf, Penfield, N.Y., assignor to The Schlegel Manufacturing Company, Rochester, N.Y., a corporation of New York
Filed May 4, 1965, Ser. No. 453,154
U.S. Cl. 49—440                          12 Claims
Int. Cl. E05d 13/02

This invention pertains to a window glass frame and guide and a method of making such frame and guide for window glass, and more particularly to an improved window frame that is simple, and economical and formable of an aluminum frame in which glass guide strips are assembled, the entire unit being anodized after assembly to effect a saving in manufacturing costs.

A numerous assortment of window glass guides are known in the prior art, and most of them are formed of wool pile fabric strips arranged on opposite sides of the glass to be guided. Generally, such pile fabric strips are fastened to an insert of some sort which is secured in place inside the frame in which the window is held. These prior art devices have been expensive to manufacture and assemble and have not been entirely satisfactory in functioning; furthermore, automobile window frames are now made of anodized aluminum, and since such prior art devices cannot withstand anodization treatment along with the window frame, they must be installed after anodization.

It is an object of this invention to overcome the drawbacks of the prior art devices by forming window glass guides that can be easily assembled with a window frame before or after anodization of the frame, the guides and frame cooperating to form a simple and reliable window guiding structure.

Another object of the invention is to reduce the manufacturing costs of window glass guides and frames.

Another object of the invention is to make a window frame and guide assembly adapted for automobiles and so constructed that the frame may be formed of aluminum and anodized after assembly of the glass guide within the frame.

Another object of the invention is to make a window glass frame and guide that is more reliable and durable in functioning and which nevertheless is more economical to manufacture, assemble, and install.

Generally, the invention is embodied in a metal frame having a window glass channel at least one of the walls of which is provided with a slot longitudinal of the channel and T-shaped or dovetailed in cross section in which a glass guide is retained. A glass guide according to the invention is preferably in the form of a row of upstanding pile fibers secured to a backing strip, the backing strip being laterally wider than the area of juncture between the pile row and the strip. Such a glass guide strip according to the invention is preferably formed of a synthetic plastic material such as polypropylene which can be formed into a dense pile and is preferred for its wear life, low co-efficient of friction relative to a window glass, and resistance to discoloration, insects, rot, and mildew. Furthermore, the preferred glass guide strip according to the invention is inert to the aluminum anodization process so that such strips can be placed in aluminum window frames adapted for automobiles and anodized after assembly in such frames.

The backing strip for the inventive glass guide is preferably stiff enough longitudinally of the fiber strips so that it can be inserted into the T-shaped or dovetailed slot flat against the bottom of such slot and threaded lengthwise into the slot so that the pile row extends from the slot into the window glass channel. Such glass guides are preferably arranged in slots in opposed side walls of the window glass channel, and a third glass guide strip can be added to the bottom of the glass guide channel, all for supporting a window glass at its edge and sides adjacent thereto.

To these and other ends, the invention resides in certain improvements and combinations, all as will be hereinafter more fully described, the novel features being pointed out in the claims at the end of this specification.

Figure 2:
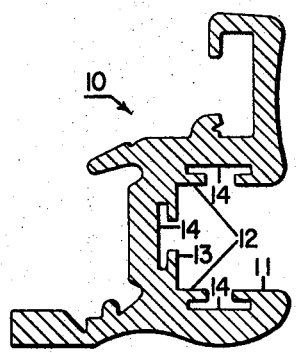
Figure 3:
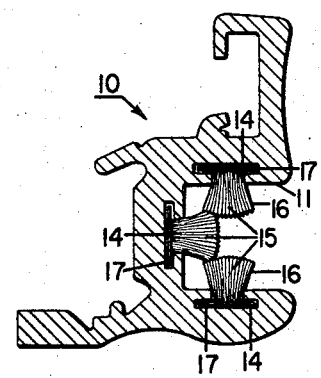
Figure 4:
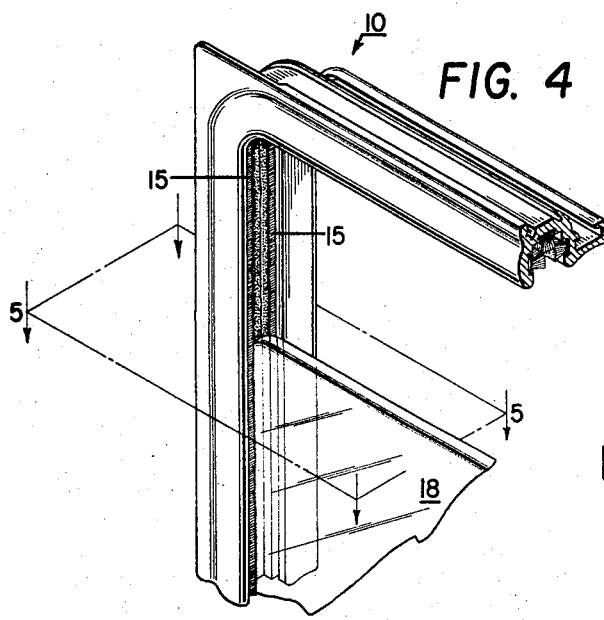
Figure 5:
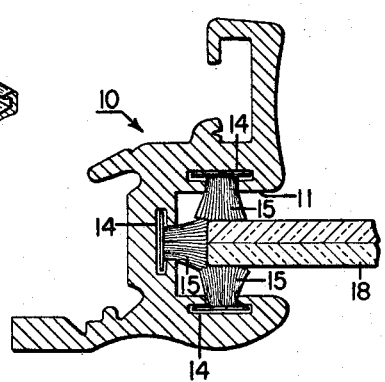

In the drawings:
FIG. 1 shows a segment of a metal window frame strip formed to provide a window glass channel according to the invention;
FIG. 2 shows a cross section of the window frame strip of FIG. 1 taken in the plane 2—2 and viewed in the direction of the arrows;
FIG. 3 shows the cross section of FIG. 2 in which glass guide strips according to the invention have been inserted;
FIG. 4 shows a segment of a window frame strip with window glass guides according to the invention formed into an automobile window frame in which a window glass is arranged; and
FIG. 5 shows a cross section of the window frame and glass assembly of FIG. 4 taken in the plane 5—5 and viewed in the direction of the arrows.

In all the figures, corresponding parts and elements are identified by the same reference numerals.

The window frame strip 10 is formed preferably as a straight, continuous strip by well-known metal-forming operations, and is provided with a glass guide channel 11. Channel 11 is preferably formed with opposed, generally parallel side walls 12 and a bottom wall 13 as best shown in FIG. 2.

At least one wall of channel 11, and preferably both side walls 12 and the bottom wall 13 are provided with slots 14 that extend longitudinally of the channel and that are wider at their bottoms than at their juncture with the walls of channel 11 so as to be generally dovetailed or T-shaped in cross section.

As best shown in FIGS. 3 and 5, glass guide strips 15 are retained in T-shaped slots 14. Glass guide strips 15 are preferably formed as a row of pile fiber 16 secured to a backing strip 17, the backing strip 17 being laterally wider than the area of juncture between the pile row 16 and backing strip 17, so as to provide longitudinal side edges of backing strip to which the pile is attached.

The width of backing strip 17 preferably corresponds to the greatest width of slots 14 at the bottoms thereof and the width of pile row 16 preferably corresponds to the narrowest portions of slots 14 where they communicate with the walls 12 and bottom 13 of channel 11. Glass guide strips 15 can then be inserted endwise in strip 10 and threaded lengthwise thereof with pile rows 16 extending from slots 14 and into channel 11 as best illustrated in FIGS. 3 and 5. Backing strips 17 are preferably stiff enough to allow such longitudinal threaded insertion of guide strips 15 into frame strip 10.

Glass guide strips 15 are retained in their respective slots 14 by backing strips 17 being laterally wider than the narrowest part of slots 14. Slots 14 and strips 15 are thus configured to cooperate in supporting strips 15 in place with pile rows 16 properly oriented in channel 11.

Glass guide strips 15 can be cemented, staked or secured in place by fasteners to prevent movement longitudinally of strip 10. However, glass guide strips 15 are preferably inserted into strip 10 before strip 10 is formed into the shape of a window frame such as partially illustrated in FIG. 4, and after forming strip 10 into the desired window shape, the curves in the resultant frame are sufficient to prevent longitudinal movement of guide strips 15 within the frame.

As best shown in FIGS. 4 and 5, the resulting window frame 10 with its strips 15 retained in slots 14 is adapted for supporting and guiding window glass 18. The pile fiber rows 16 of strips 15 preferably engage the edge and opposing sides adjacent the edge of window glass 18 for centering and supporting the window glass within channel 11 and guiding its movement therein.

Guide strips 15 can be formed of a variety of materials including wool pile, and combinations of natural and synthetic fibers and materials. In a preferred form of the invention, strips 15 are formed of synthetic plastic material, and preferably of polypropylene which has the advantages of a long flex and wear life and capacity to be economically formed into a dense pile secured to a backing strip. Also, polypropylene glass guide strips can be made of sufficient stiffness to be threadably inserted lengthwise into slots 14 and yet be resilient enough to conform to curves formed in window frame strip 10. In addition, a pile row of polypropylene engages the surfaces and edges of window glass 18 resiliently and with low friction, and polypropylene and other synthetic materials are resistant to insects, rot, mildew, and discoloration. Another advantage of such synthetic materials is that many of them, and polypropylene in particular, are inert to the aluminum anodization process. This allows such glass guide strips to be inserted into an aluminum frame for an automobile window and for the aluminum to be anodized with the guide strips in place so that assembly operations after anodization are unnecessary. This alone effects a considerable saving in the manufacture of automobile window frames and guides.

Generally, the anodization of aluminum involves several steps that would be destructive or harmful to wool pile window glass guides, and many prior art liners and inserts for window glass channels. In accomplishing anodization, the aluminum frame is first washed in a mild detergent and rinsed with clear water. It is then de-oxidized with a solution of nitric acid and again rinsed with clear water. A caustic etch is applied to the aluminum and the de-oxidizing step is repeated. The metal is then placed in an electro-plating bath of approximately 16 percent solution of sulphuric acid. The aluminum acts as an anode and an electric current of approximately 12 amps. per square foot of metal is applied to the electro-plating bath. The degree of anodizing is determined by the length of the electro-plating cycle, and after the electro-plating is completed, the metal is rinsed in hot nickel acetate followed by a hot-water rinse. Variations of this anodization procedure are known, and the inventive window frame is not dependent on anodization or any particular anodization method.

It can be seen from the above that anodization would be detrimental to prior art window glass guides, piles, liners, channel inserts, etc., and an important advantage of window glass guides 15 and their simple assembly and retention within a channel in window frame strip 10 is that such guide strips can undergo the anodization treatment of an aluminum frame strip without detriment or harm to the guide strips. The simplicity of the assembly in retention of the guide strips within the frame, and the selection of proper materials for making the guide strips thus give an important advantage.

The strip 10 can be formed into the desired shape of window frame either before or after anodization, but preferably after strips 15 are inserted in such frame. No particular metal forming of frame strip 10 is essential to the invention, and the inventive window frame and guide can be used for windows other than automobile windows and can be used for frames other than those made of aluminum.

While the invention has been disclosed herein by reference to the details of a preferred embodiment, it is to be understood that such disclosure is intended in an illustrative, rather than a limiting, sense, and it is contemplated that various modifications of the construction and arrangement of the parts and the sequence of the inventive method will readily occur to those skilled in the art, within the spirit of the invention and the scope of the appended claims.

I claim:

1. A guide for an unframed, movable window glass in a motor vehicle, said guide comprising:
    (a) a member formed to define a channel wider than the thickness of said window glass and having a bottom wall and a pair of opposed side walls arranged to straddle the edge of said window glass, each of said side walls having a slot opening into said channel and extending longitudinally of said channel, said slot being wider at its bottom than at its top; and
    (b) a pair of fabric strips one of which is arranged in each of said slots, said fabric strips each comprising a pile row interwoven with a woven fabric backing strip to extend from one face of said backing strip, said backing strip extending laterally beyond the area of juncture between said pile row and said backing strip, said backing strip being wider than said top of said slot and being retained in said slot flat against the bottom of said slot with said pile row extending from said top of said slot into said channel so that said pile rows of said pair of fabric strips bear against opposite faces of said unframed window glass.

2. The structure of claim 1 wherein said bottom of said channel is provided with one of said slots, and one of said fabric strips is retained in said slot in said channel bottom to engage the edge of said unframed window glass.

3. The structure of claim 1 wherein said channel member is formed of aluminum and said fabric strip is formed of a synthetic plastic material.

4. The structure of claim 3 wherein said synthetic material is polypropylene.

5. The structure of claim 3 wherein said synthetic material is inert to the process of anodizing of aluminum.

6. The structure of claim 1 including means for securing the ends of said fabric strips in place in said channel member.

7. The structure of claim 1 wherein each of said slots is generally T-shaped.

8. A method of making a frame and guide for a movable window glass for a motor vehicle, said method comprising:
    (a) extruding a metal strip with a straight, longitudinal channel having a bottom wall and a pair of opposed side walls spaced apart wider than the thickness of said window glass, at least one of said walls having a slot opening into said channel and extending longitudinally of said channel, said slot being wider at its bottom than at its top;
    (b) making a fabric strip comprising a pile row interwoven with a woven fabric backing strip to extend from one face of said backing strip, said backing strip being relatively stiff and both wider than the area of juncture of said pile row and said backing strip and wider than said top of said slot;
    (c) inserting an end of said fabric strip into said slot so that said backing strip lies flat against the bottom of said slot and said pile row extends from said slot into said channel;
    (d) pushing said fabric strip into slot longitudinally of said channel; and then
    (e) bending said channel strip into a frame configured to fit at least two sides of said window glass.

9. The method of claim 8 with the additional step of securing the ends of said fabric strip to said channel strip before bending said channel strip into said frame.

10. The method of claim 8 including forming one of said slots in each of said bottom and side walls, and pushing one of said fabric strips into each of said slots.

11. The method of claim 8 in which said channel strip is formed of aluminum, and as an additional step, said channel strip is anodized after said fabric strip is positioned in said slot.

12. The method of claim 8 with the additional step of arranging an unframed window glass in said channel so as to bear against said pile row.

References Cited

UNITED STATES PATENTS

| | | | |
|---|---|---|---|
| 2,841,834 | 7/1958 | Poole | 49—489 X |
| 3,175,256 | 3/1965 | Horton | 49—489 |
| 3,258,876 | 7/1966 | Deisenroth et al. | 49—441 |

FOREIGN PATENTS

| | | |
|---|---|---|
| 250,410 | 3/1964 | Australia. |
| 386,504 | 1/1933 | Great Britain. |

DAVID J. WILLIAMOWSKY, *Primary Examiner.*

J. KARL BELL, *Assistant Examiner.*

U.S. Cl. X.R.

49—416, 489